Nov. 17, 1970  C. G. FLOWERS  3,540,170
PORTABLE INFLATABLE BLIND
Filed Sept. 6, 1968  2 Sheets-Sheet 1
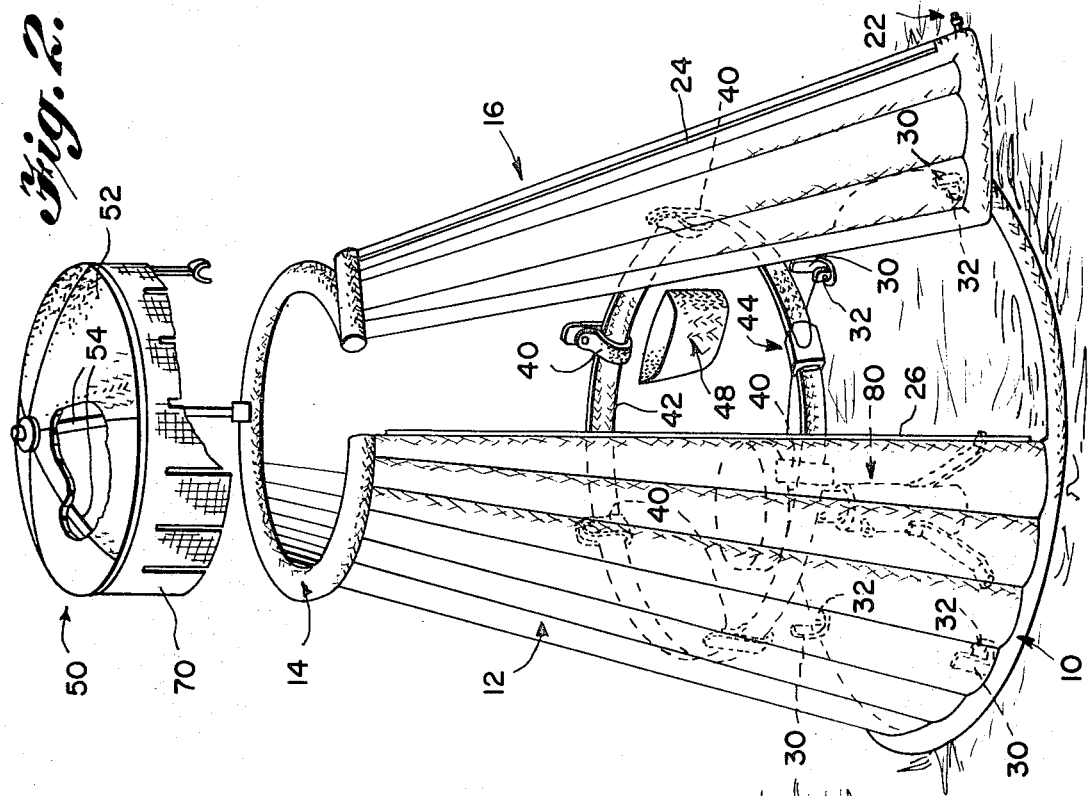
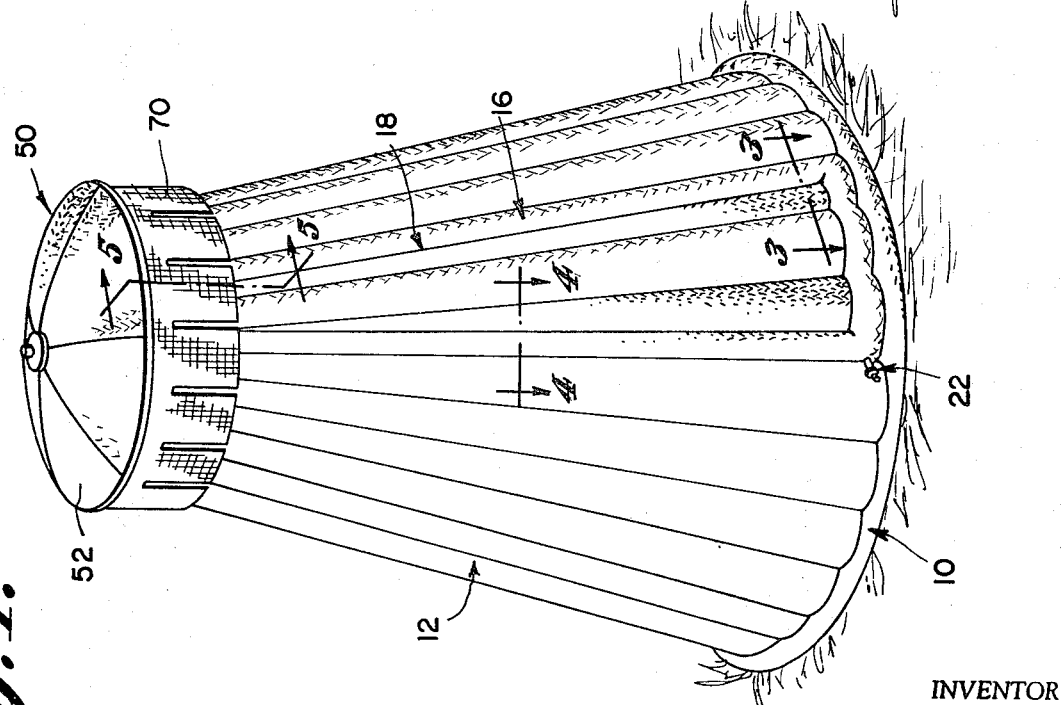
INVENTOR
CURTIS G. FLOWERS
BY *Shoemaker and Mattare*
ATTORNEYS Nov. 17, 1970
C. G. FLOWERS
3,540,170
PORTABLE INFLATABLE BLIND
Filed Sept. 6, 1968
2 Sheets-Sheet 2
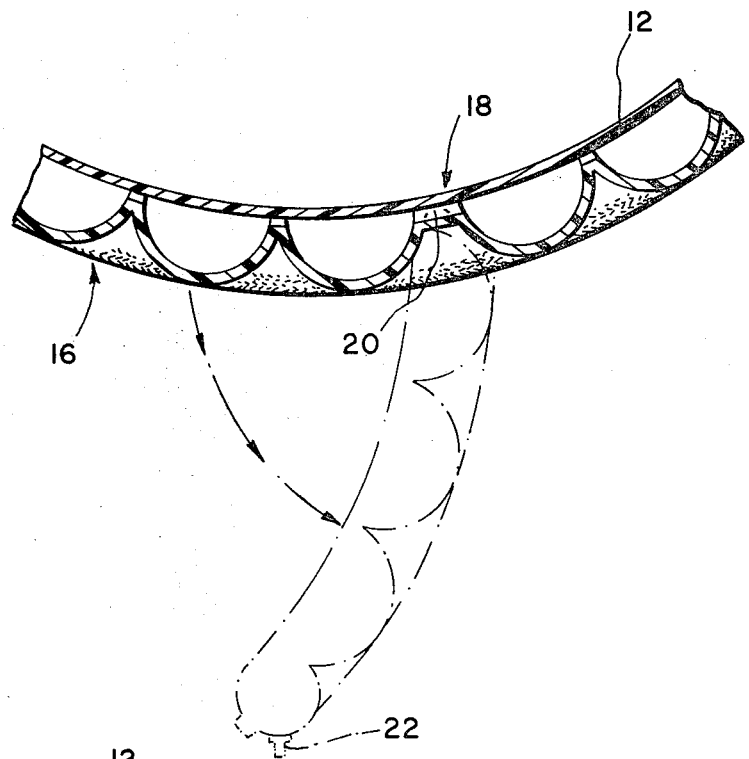
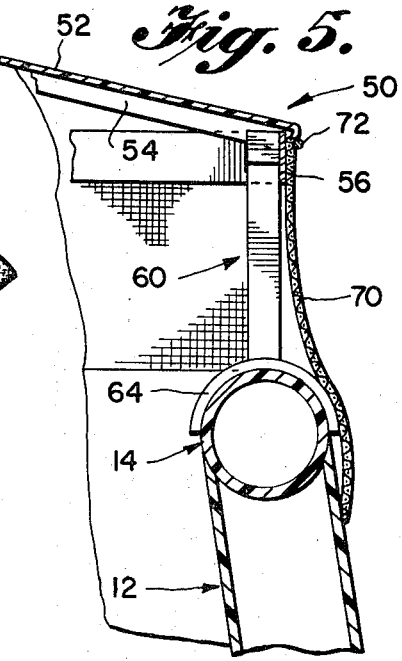
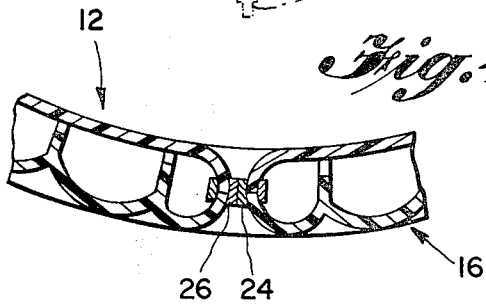
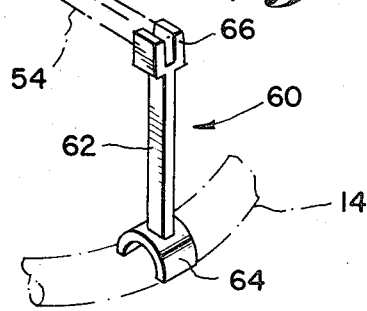
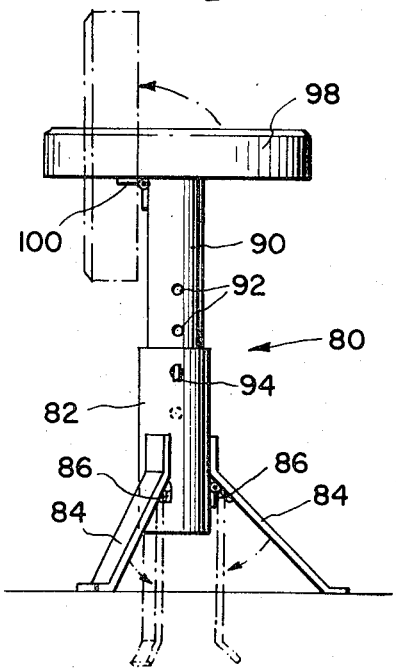
INVENTOR
CURTIS G. FLOWERS
BY *Shoemaker and Mattare*
ATTORNEYS United States Patent Office 3,540,170
Patented Nov. 17, 1970

3,540,170
PORTABLE INFLATABLE BLIND
Curtis G. Flowers, Rte. 2, Box 5400 L2,
Anderson, Calif. 96007
Filed Sept. 6, 1968, Ser. No. 757,924
Int. Cl. E04g 11/04
U.S. Cl. 52—2      8 Claims

ABSTRACT OF THE DISCLOSURE

An inflatable body means defines a side wall and a door portion swingably connected therewith along with means for holding the door portion in closed position. A flexible belt engages loops within the body means for carrying the blind, and hold-down straps interconnected with the body means are adapted to hold the body means in position relative to a supporting surface. A top canopy is detachably supported in spaced relationship to the top of the body means by a plurality of spaced support members. A curtain is suspended from the canopy for camouflaging an occupant, while allowing him to see through the curtain to view the surrounding area.

BACKGROUND OF THE INVENTION

The present invention relates to a portable inflatable blind, and more particularly to a blind as used for duck hunting and ice fishing or the like. This type of blind provides shelter for an occupant, and particularly in the case of a duck blind is designed to camouflage the occupant, and yet at the same time to allow the occupant to readily see outwardly of the blind to view the surrounding area.

Conventional duck blinds are usually fixed installations and accordingly are limited to one particular location. In many cases, it is desirable to have a blind which can be readily moved from place to place depending upon local conditions.

Ice fishing shelters on the other hand are generally portable, but these types of structures are rather complex and bulky in construction. A particular difficulty with this type of arrangement is that the components are rather difficult to move from one place to another and require a considerable amount of area during such movement. Additionally, the size of the components are such that they cannot be readily stored during such transportation. A further disadvantage of prior art arrangements of this type is the fact that they are excessively difficult to assemble and disassemble.

SUMMARY OF THE INVENTION

In the present invention, an inflatable flexible body means is provided which incorporates a door portion. Means is provided for inflating the body means and for retaining it in a desired configuration while in use.

A canopy is readily attached to the top of the body means, and a curtain is suspended from the canopy to camouflage the occupant, and yet at the same time allow him to readily see outwardly of the blind.

The construction of the present invention is very lightweight, and when the body means is deflated, it occupies only a very minimum amount of space thereby enabling the blind to be readily carried about.

A belt engages loops on the inner surface of the body means. It is often desirable to move the blind while therewithin. This cannot be readily accomplished with conventional blinds. In the present invention, the belt secured to the blind can be fastened around the occupant who can then stand up, after removing the hold-down stakes, whereupon the occupant can move toward game or a different location carrying the entire blind with him.

The various other components of the structure of the present invention can be readily assembled and disassembled with respect to one another, and the entire assembly may thereby be readily transported to a desired position, and assembled and subsequently disassembled in a minimum amount of time and with very little effort.

BRIEF DESCRIPTION OF THE DRAWINGS

FIG. 1 is a top perspective view of a blind according to the present invention;

FIG. 2 is a top perspective view showing the blind of FIG. 1 with certain parts in exploded and cut away relationship and with the door portion shown in its open position;

FIG. 3 is a sectional view on an enlarged scale taken substantially along line 3—3 of FIG. 1 looking in the direction of the arrows;

FIG. 4 is a sectional view on an enlarged scale taken substantially along line 4—4 of FIG. 1 looking in the direction of the arrows;

FIG. 5 is a sectional view on an enlarged scale taken substantially along line 5—5 of FIG. 1 looking in the direction of the arrows;

FIG. 6 is a top perspective view illustrating one of the support members employed for holding the top canopy in position; and FIG. 7 is a view illustrating the chair means employed for supporting an occupant within the blind.

DESCRIPTION OF THE PREFERRED EMBODIMENT

Referring now to the drawings wherein like reference characters designate corresponding parts throughout the several views, the blind comprises a body means including a bottom tubular ring portion 10 which joins with a side wall portion 12, this side wall portion 12 in turn joining with an upper tubular portion 14 as seen in FIG. 2. This body means is formed of a plurality of interconnected pleated portions similar to the construction of a conventional air mattress, the various portions of the body means being interconnected with one another so that the entire body means can be inflated as hereinafter described. The bottom tubular ring 10 is illustrated as being in one piece in order to help retain the desired finished configuration of the apparatus, although it may be discontinuous if so desired. The body means is formed of rubber or similar material.

The body means includes a door portion indicated generally by reference numeral 16 which is swingably interconnected with the adjacent body portion along a seam indicated generally by reference numeral 18 as seen most clearly in FIG. 3. The seam may be formed by stitching the inner and outer walls of the body means to one another, the hollow construction of the body means being readily apparent in this figure of the drawings. As seen in FIG. 3, an air passage 20 is provided between the side wall portion 12 of the body means and the door portion.

As seen most clearly in FIGS. 1 and 2, a conventional filling valve 22 is provided in the door portion whereby the entire body means can be readily inflated in the usual manner. The air passage 20 allows air to pass freely between the door portion and the remainder of the body means so that it can be inflated into the final operative position as seen in FIGS. 1 and 2 wherein the body means defines a substantially frusto-conical configuration.

Holding means is provided for holding the door portion in closed position and includes a strip of magnetic material 24 secured along one edge of the door portion. A cooperating strip of metallic material 26 is secured along an adjacent portion of the body means. As seen in FIG. 4, the two strips 24 and 26 are adapted to be juxtaposed with respect to one another when the door is in its closed position such that the strips 24 and 26 will be magnetically attracted to one another to hold the door in closed position.

In order to hold the body means down with respect to a supporting surface, a plurality of hold-down straps 30 are affixed to the inner surface of the body means, these hold-down straps defining loop portions which are adapted to receive stakes 32 driven into the underlying surface. Four such hold-down straps may be provided about the inner periphery of the blind as seen most clearly in FIG. 2.

A plurality of loops 40 are suitably secured to the inner surface of the body means as seen in FIG. 2 approximately half-way up the side wall of the body means, these loops receiving an elongated flexible belt 42 having a quick-release type buckle mechanism 44 as employed for example in automotive seat belts. This belt is adapted to be secured around the hunter's body. When the hunter desires to move closer to game or the like, he can pull out the holddown stakes, fasten the belt tightly around him and then stand up to lift the blind off of the ground. The seat means hereinafter described can then be hooked onto the belt and the hunter and the entire blind can then move to a desired location.

A pocket indicated generally by reference numeral 48 is suitably supported by the inner surface of the side wall of the body means and may comprise an additional lamination of material.

A top canopy is indicated by reference numeral 50 and includes a generally dome-shaped roof portion 52 having a plurality of radially etxending stays 54 disposed in depending relationship from the undersurface thereof to rigidify the canopy. This canopy may be formed of a suitable waterproof material such as plastic. As seen most clearly in FIG. 5, the canopy includes a depending peripherally extending flange 56 formed adjacent the outer edge thereof.

A plurality of support members are provided for supporting the canopy in spaced relationship to the top of the body means. One of these support members is indicated generally by reference numeral 60 in FIG. 6 of the drawings and has an elongated central part 62 including a clamping lower end portion 64 which is of generally arcuate cross-sectional configuration such that it is adapted to be clamped upon the tubular portion 14 formed at the upper end of the body means. The upper end 66 of the support member is bifurcated and is adapted to receive one of the depending stays of the canopy.

A plurality of support members 60 are disposed about the top of the body means and are engaged with each of the stays of the canopy, these stays being snugly received within the bifurcated upper ends of the various support members. In this manner, the support members are readily attachable and detachable with respect to the body means so that the canopy and the associated support members may be readily assembled and disassembled when desired.

As seen most clearly in FIG. 5, a curtain 70 which may be formed of net material and the like is provided, this curtain being disposed about the depending flange 56 of the canopy and held in place by a surrounding band 72 of elastic material. It should be understood that in some cases the curtain itself may be of an elastic nature so as to be self-supporting on the flange 56.

It will be noted as seen in FIG. 5 that the curtain extends downwardly from the canopy and covers the space defined between the top of the body means and the canopy. This serves to camouflage the occupant of the blind, and yet at the same time enables the occupant to readily see outwardly of the blind. Additionally, if so desired, a gun or the like may be readily forced through this space simply by pushing outwardly and lifting the curtain out of the way.

Referring now to FIG. 7 of the drawings, a seat construction is illustrated for use with the blind of the present invention. This seat construction includes a tubular support 82 having a plurality of legs 84 which may be three in number hingedly interconnected therewith by hinges 86.

A tubular member 90 is telescopically received within tubular portion 82. Member 90 has a plurality of holes 92 formed therethrough which are adapted to be aligned with suitable holes provided in tubular portion 82 whereupon a pin 94 is inserted through the aligned holes for retaining tubular portion 90 in a particular adjusted relationship with respect to tubular portion 82.

A seat portion 98 is hingedly interconnected with the upper end of tubular portion 90 by a hinge 100. It is apparent that the seat portion 98 as well as the legs 84 may be pivoted into the phantom line positions shown in FIG. 7 so as to enable the seat means to be stored in a minimum of space.

If the occupant needs to snap shoot for ducks, geese, and deer or the like, the canopy means can be flipped off with one hand, and the hunter is free to shoot. If he desires to leave the blind completely, the belt means is released and he can step through the door means so as to be completely free of the blind.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A portable inflatable blind comprising: a self-supporting generally frusto-conically shaped inflatable means including a bottom tubular inflatable ring shaped frame member, a top tubular inflatable ring shaped frame member spaced from said bottom frame member and having a smaller diameter than said bottom frame member, an annular flexible inflatable side wall comprising a plurality of interconnected pleated portions extending longitudinally between and connected to said top and bottom frame members and supported in said frusto-conical configuration by said frame members, an opening in said side wall extending from the top frame member to the bottom frame member, an inflatable door for closing said opening pivotally secured along one longitudinal edge thereof to said side wall at one side of said opening, magnet means on the opposite longitudinal edge of said door and on the body means at the other side of said opening for holding said door in closed position in said opening, a top canopy, support means engaging said top tubular ring and removably supporting said top canopy spaced from the top of said body means, a curtain means supported by and depending from said canopy and covering the space defined between the top of said body means and said canopy, inflation valve means in said door and air passage means between said door and said side wall for admitting air to inflate said body means, a plurality of spaced loops secured to an inside surface of said side wall intermediate the upper and lower ends thereof, an elongated flexible belt positioned within said loops and adapted to be positioned about a person within said blind so that said person is enabled to carry said blind from one location to another location by means of said belt, and spaced apart hold down means on said body means adjacent the bottom frame member for holding said blind in proper operative position.

2. A portable inflatable blind as in claim 1 wherein a pocket means is supported by an inner surface of the side wall for receiving and holding articles therein.

3. A portable inflatable blind as defined in claim 1 wherein said top canopy includes a peripherally extending depending rigid flange secured adjacent the outer edge of the canopy.

4. A portable inflatable blind as defined in claim 3 wherein said curtain means is disposed adjacent to and is supported by said depending flange.

5. A portable inflatable blind as defined in claim 1 wherein said support means engaging said top tubular ring comprises a plurality of spaced support members secured to the top of said body means, said top canopy being interconnected with said support means for holding the top canopy in operative position.

6. A portable inflatable blind as defined in claim 5 wherein each of said support members includes a lower clamping portion for clamping the support members in operative position on the top of said body means.

7. A portable inflatable blind as defined in claim 5 wherein each of said support members defines a slot in the upper surface thereof for receiving a portion of said top canopy.

8. A portable inflatable blind as defined in claim 7 wherein said top canopy includes a plurality of stays, each of said stays being received within the slot of one of said support members.

References Cited

UNITED STATES PATENTS

| | | | |
|---|---|---|---|
| 2,478,268 | 8/1949 | Hudson. | |
| 2,946,337 | 7/1960 | Wolshin | 52—2 |
| 3,025,866 | 3/1962 | Cockrum | 135—5 |
| 3,169,543 | 2/1965 | McGerty | 135—1 |
| 3,393,479 | 7/1968 | Slotnick | 52—2 |

FRANK L. ABBOTT, Primary Examiner

S. D. BURKE III, Assistant Examiner

U.S. Cl. X.R.

43—1; 135—1